United States Patent
Soldati

(10) Patent No.: US 9,986,564 B2
(45) Date of Patent: May 29, 2018

(54) METHOD IN A NETWORK CONTROL NODE

(71) Applicant: HUAWEI TECHNOLOGIES CO., LTD., Shenzhen (CN)

(72) Inventor: Pablo Soldati, Kista (SE)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days. days.

(21) Appl. No.: 14/700,856

(22) Filed: Apr. 30, 2015

(65) Prior Publication Data
US 2015/0237632 A1    Aug. 20, 2015

Related U.S. Application Data

(63) Continuation of application No. PCT/EP2012/071736, filed on Nov. 2, 2012.

(51) Int. Cl.
| | | |
|---|---|---|
| H04W 72/12 | (2009.01) | |
| H04W 72/04 | (2009.01) | |
| H04L 5/00  | (2006.01) | |

(52) U.S. Cl.
CPC ......... H04W 72/0453 (2013.01); H04L 5/003 (2013.01)

(58) Field of Classification Search
USPC ......................................................... 370/329
See application file for complete search history.

(56) References Cited

U.S. PATENT DOCUMENTS

| | | | |
|---|---|---|---|
| 7,889,633 B2 | 2/2011 | Noh et al. | |
| 9,210,701 B2 | 12/2015 | Yang et al. | |
| 2011/0149758 A1 | 6/2011 | Yang et al. | |
| 2012/0307771 A1* | 12/2012 | Yang .................. | H04W 72/042 370/329 |

(Continued)

FOREIGN PATENT DOCUMENTS

| | | |
|---|---|---|
| CA | 2 646 693 | 10/2007 |
| CN | 101207469 A | 6/2008 |

(Continued)

OTHER PUBLICATIONS

U.S. Appl. No. 61/720,401, filed Oct. 31, 2012.*
(Continued)

*Primary Examiner* — Edan Orgad
*Assistant Examiner* — Sithu Ko
(74) *Attorney, Agent, or Firm* — Staas & Halsey LLP

(57) ABSTRACT

The present invention relates to a method in a network control node of a wireless communication system, said wireless communication system using a system frequency bandwidth for downlink transmissions from said network control node to one or more mobile stations of said wireless communication system; said method comprising the steps of: allocating K number of sets of physical resource units arbitrarily chosen within said system frequency bandwidth for downlink transmissions, wherein K is an integer equal to or larger than 1 and the number of physical resource units of each set is selected from a finite set of allowed values; jointly encoding the frequency positions of the K number of sets of physical resource units into a first unique combinatorial index q; and signalling said first combinatorial index q in the downlink.

14 Claims, 2 Drawing Sheets

(56) References Cited

U.S. PATENT DOCUMENTS

| | | | | |
|---|---|---|---|---|
| 2013/0176952 | A1* | 7/2013 | Shin | H04L 5/001 370/329 |
| 2013/0183987 | A1* | 7/2013 | Vrzic | H04L 1/0046 455/450 |
| 2013/0235817 | A1* | 9/2013 | Wu | H04L 5/0094 370/329 |

FOREIGN PATENT DOCUMENTS

| | | |
|---|---|---|
| CN | 101238672 | 8/2008 |
| CN | 101657018 A | 2/2010 |
| CN | 101953129 A | 1/2011 |
| CN | 102754504 A | 10/2012 |

OTHER PUBLICATIONS

PCT International Search Report dated Aug. 28, 2013 in corresponding International Patent Application No. PCT/EP2012/071736.

Huawei, HiSilicon, "DMRS sequences for ePDCCH", 3GPP TSG RAN WG1 meeting #68, Germany, Feb. 2012, 8 pp.

Catt, "E-PDCCH set configuration", 3GPP TSG RAN WG1 Meeting #70bis, San Diego, USA, Oct. 2012, 5 pp.

Huawei, HiSilicon, "EPDCCH resource allocation", 3GPP TSG RAN WG1 Meeting #70bis, San Diego, USA, Oct. 2012, 4 pp.

NEC Group, "ePDCCH PRB configuration", 3GPP TSG RAN WG1 Meeting #70bis, San Diego, USA, Oct. 2012, 5 pp.

LG Electronics, "Details of EPDCCH set configuration", 3GPP TSG RAN WG1 Meeting #70bis, San Diego, USA, Oct. 2012, 4 pp.

Samsung, "Design Aspects for EPDCCH Sets", 3GPP TSG RAN WG1 #70bis, San Diego, USA, Oct. 2012, 4 pp.

"3rd Generation Partnership Project; Technical Specification Group Radio Access Network; Evolved Universal Terrestrial Radio Access (E-UTRA); Physical layer procedures (Release 11)", 3GPP TS 36.213, V11.0.0, Sep. 2012, pp. 1-143.

MCC Support, "Final Report of 3GPP TSG RAN WG1 #69 v1.0.0", 3GPP TSG RAN WG1 Meeting #70, China, Aug. 2012, pp. 1-123.

MCC Support, "Final Report of 3GPP TSG RAN WG1 #67 v1.0.0", 3GPP TSG RAN WG1 Meeting #68, Germany, Feb. 2012, pp. 1-89.

International Search Report dated Aug. 28, 2013 in corresponding international application PCT/EP2012/071736.

Chinese Office Action dated Feb. 23, 2017 in Chinese Patent Application No. 201280076615.1.

* cited by examiner

| N | M=2 bits | M=2 % | M=4 bits | M=4 % | M=6 bits | M=6 % | M=8 bits | M=8 % | M=10 bits | M=10 % | M=12 bits | M=12 % | M=16 bits | M=16 % |
|---|---|---|---|---|---|---|---|---|---|---|---|---|---|---|
| 6 | 7 | 55% | 12 | - | - | - | - | - | - | - | - | - | - | - |
| 15 | 10 | 67% | 19 | 37% | - | - | - | - | - | - | - | - | - | - |
| 25 | 12 | 76% | 22 | 72% | 30 | 40% | 37 | 26% | - | - | - | - | - | - |
| 50 | 14 | 86% | 26 | 74% | 36 | 64% | 46 | 54% | 53 | 47% | - | - | - | - |
| 100 | 16 | 92% | 30 | 85% | 43 | 78% | 54 | 73% | 63 | 69% | 73 | 64% | - | - |

M  RESOURCE UNITS IN EPDCCH SET

N  RESOURCE UNITS IN SYSTEM BANDWIDTH

Fig. 2

METHOD IN A NETWORK CONTROL NODE

CROSS-REFERENCE TO RELATED APPLICATIONS

This application is a continuation of International Application No. PCT/EP2012/071736, filed on Nov. 2, 2012, which is hereby incorporated by reference in its entirety.

TECHNICAL FIELD

The present invention relates to a method in a network control node. Furthermore, the invention also relates to a corresponding method in a mobile station, a network control device, a mobile station device, a computer program, and a computer program product.

BACKGROUND OF THE INVENTION

The downlink of the 3GPP Long Term Evolution (LTE) cellular wireless communication system is based on Orthogonal Frequency Division Multiplex (OFDM) transmissions, which uses time and frequency resource units for transmission. The smallest time-frequency resource unit, called Resource Element (RE), consists of a single complex sinusoid frequency (sub-carrier) in an OFDM symbol. For the purpose of scheduling transmissions to the different User Equipments (UEs), the resource elements are grouped into larger units called Physical Resource Blocks (PRBs). A PRB occupies a half of a subframe, called "slot", consisting of six or seven consecutive OFDM symbol intervals in time domain (0.5 millisecond in total), and twelve consecutive sub-carrier frequencies in frequency domain (180 kHz in total).

Each PRB is indicated by a unique index $n_{PRB} \in [0, N_{RB}^{DL}-1]$ denoting the position of the sub-band that the PRB occupies within a given bandwidth, where $N_{RB}^{DL}-1$ is the total number of PRBs within the bandwidth. The maximum number of PRBs $N_{RB}^{max,DL}$, associated with the largest LTE bandwidth (20 MHz), is 110. The relation between the PRB number $n_{PRB}$ in the frequency domain and resource elements (k,l) in a slot is $n_{PRB}=\lfloor k/N_{sc}^{RB} \rfloor$.

The LTE Rel-8/10 defines a Physical Downlink Control Channel (PDCCH) as a signal containing information needed to receive and demodulate the information transmitted from a serving cell, called eNodeB in LTE terminology, to a UE through the Physical Downlink Shared Channel (PDSCH). The PDCCH is transmitted in a control region that can occupy up to four OFDM symbols at the beginning of each subframe, whereas the remaining of the subframe forms the data region used for the transmission of the PDSCH channel.

The LTE Rel-11 supports a new control channel scheduled within the time-frequency resources of the downlink data region. Unlike the legacy PDCCH, this new feature, known as Enhanced Physical Downlink Control Channel (EPDCCH), has the distinct characteristic of using Demodulation Reference Signals (DMRS) for demodulation and, consequently, the ability to associate each EPDCCH with a specific mobile station, called UE in LTE terminology, i.e. DMRS signals are UE-specific.

The EPDCCH transmission can be either localized or distributed with the granularity of one PRB pair. With localized transmission, the EPDCCH for a UE is preferably transmitted over a single PRB pair (or, in some cases, over a few consecutive PRB pairs) scheduled by the associated eNodeB based on channel quality indicator (CQI) feedback information (i.e., by means of frequency selective scheduling); with distributed transmission on the other hand, the EPDCCH is transmitted over multiple PRB pairs spread over the downlink system bandwidth to achieve frequency diversity. The latter scheme is useful if there is no feedback from the mobile station or the available feedback is not reliable, although more resources (i.e. PRBs) are locked for EPDCCH transmission.

The EPDCCH design is based on a UE specifically configured search space. In particular, for a given mobile station, the serving cell (e.g. eNodeB in LTE) can allocate up to K=2 sets of physical resource units, called EPDCCH sets in LTE terminology, each consisting of a group of M={2, 4 or 8} PRB pairs, where M is not necessarily the same when two EPDCCH sets are allocated. Each EPDCCH set can be configured for either localized or distributed EPDCCH transmission. The unit block for EPDCCH multiplexing and blind decoding is the Enhanced Control Channel Element (ECCE), which consists of a block of resource elements in a PRB pair. When EPDCCH is transmitted, a plurality of ECCEs can be aggregated together based on the payload size and coding rate of the transmitted EPDCCH creating different aggregation levels, e.g. one, two, four, eight and sixteen. Therefore, one PRB pair can contain one or more ECCEs depending on the ECCE size and the mapping rule used to map EPDCCH to the PRB pair. For EPDCCH demodulation, four DMRS antenna ports 107-110 can be used. In order to reduce the detection complexity, the antenna port used for EPDCCH transmission shall be known to the mobile station. One way to indicate the used antenna ports to the mobile station is an implicit association between antenna ports and useful ECCEs. Several other methods for antenna port associations have been discussed, and the latest agreement is that with localized allocation, each ECCE index is associated by specification with one antenna port.

A key feature yet to be finalized is a method for signalling, to the mobile station, the location within the system frequency bandwidth for downlink transmissions of the sets of physical resources, i.e. PRB pairs, configured for the enhanced downlink control channel transmission. The information to be signalled consists of the indices of individual physical resource block (PRB) pairs grouped into one or two sets. While the signalling will be performed in higher layer of the system such as in the Radio Resource Control (RRC) layer, the detailed resource allocation method has not been decide. So far, prior art for allocating physical resources for the enhanced downlink control channel in the related art 3GPP LTE system has focused on two main approaches.

A first straightforward prior art method is to signal one bitmap for each allocated EPDCCH set. The bitmap associated to an EPDCCH set consists of one bit for each physical resource block (PRB) pair in the system bandwidth, where the bit is set to a specified value (e.g., 1) if the corresponding PRB pair is part of the EPDCCH set associated to the bitmap. This method offers the maximum flexibility in terms of EPDCCH set allocation as it allows to addressing any PRB pair in the downlink system bandwidth for each allocated set. The drawback is a significant overhead when the system bandwidth is large. For instance, in the related art LTE system, the largest system bandwidth consists of 110 PRB pairs (20 MHz), therefore resulting into up to 220 bits to be signalled to each mobile station.

An alternative prior art method was proposed to reduce the signalling overhead (Huawei, HiSilicon "EPDCCH resource allocation", R1-124162, San Diego, USA, Oct. 8-12, 2012). This method is inspired to the data resource allocation type 1 of the related art LTE system, as it considers groups of resource blocks (i.e. RBGs in LTE terminology), and individual PRB pairs within an RBG are indicated with a bitmap. The inventive step is the definition of an EPDCCH resource subset consisting of individual PRB pairs in RBGs spread over the system bandwidth as the basic resource allocation unit for an EPDCCH set, i.e., an EPDCCH set consists of one or more EPDCCH subsets. Both RGB size and EPDCCH subset size depend on the system bandwidth as in Table 1.

TABLE 1

Dimensioning of EPDCCH subset and RBG groups.

| System bandwidth (RB) | Subset size (RB) | Number of subset per RBG groups/ RBG size | Number of RBG groups | Overhead per EPDCCH set (bits) |
|---|---|---|---|---|
| 6 | 2 | 1 | 3 | 4 |
| 15 | 2 | 2 | 3 | 5 |
| 25 | 2 | 2 | 6 | 8 |
| 50 | 4 | 3 | 4 | 7 |
| 100 | 4 | 4 | 6 | 10 |

An EPDCCH set is then signalled by indicating the EPDCCH subsets forming the EPDCCH set, where each EPDCCH subset is signalled using two bitmaps: a first bitmap indicating the allocated EPDCCH RBG group(s); and a second bitmap indicating the EPDCCH subset(s) in the allocated EPDCCH group(s), where the bitmap is common for all the indicated EPDCCH RBG group(s). The method has the merit to significantly reduce the signalling overhead required to signal an EPDCCH set compared to the case of full bitmap. For instance, Table 1 shows that each EPDCCH set can be signalled with 10 bits in a 100 PRB bandwidth. However, the bitmap structure used to reduce the signalling overhead introduces severe limitations to the flexibility of the resource allocation both in terms of which PRB pairs can be selected for an EPDCCH set (the second bitmap must be common to all EPDCCH RBG groups indicated in the first bitmap) and in terms of the minimum size of the EPDCCH set for large system bandwidth. For instance, with a 50 or 100 PRB pair bandwidth the smallest EPDCCH set supported consists of four PRB pairs instead of two, which cannot fulfil the current EPDCCH design requirements in the related art LTE system. Similar methods to reduce the signalling overhead by means of bitmaps addressing groups of PRB pairs, at the expense of the resource allocation flexibility, have been proposed by others, such as (NEC Group, "ePDCCH PRB configuration", R1-124293, San Diego, USA, Oct. 8-12, 2012), (CATT, "EPDCCH set configuration", R1-124102, San Diego, USA, Oct. 8-12, 2012.), (Samsung, "Design Aspects for EPDCCH Sets", R1-124376, San Diego, Oct. 8-12, 2012) and (LG Electronics, "Details of EPDCCH set configuration", R1-124322, San Diego, USA, Oct. 8-12, 2012).

Hence, there is a need in the art for an improved method that meets the flexibility of a full bitmap solution for each allocated set of physical resources for downlink control channel signals transmission while reducing the signalling overhead.

SUMMARY OF THE INVENTION

An object of the present invention is to provide a solution which mitigates or solves the drawbacks and problems of prior art solutions. Another object of the invention is to provide a signalling method with reduced overhead compared to prior art methods while providing maximum resource allocation flexibility.

According to a first aspect of the invention, the above mentioned objects are achieved by a method in a network control node of a wireless communication system, said wireless communication system using a system frequency bandwidth for downlink transmissions from said network control node to one or more mobile stations of said wireless communication system; said method comprising the steps of:
    allocating K number of sets of physical resource units arbitrarily chosen within said system frequency bandwidth for downlink transmissions, wherein K is an integer equal to or larger than 1 and the number of physical resource units of each set is selected from a finite set of allowed values;
    jointly encoding the frequency positions of the K number of sets of physical resource units into a first unique combinatorial index q; and
    signalling said first combinatorial index q in the downlink.

According to a second aspect of the invention, the above mentioned objects are achieved by a method in a mobile station of a wireless communication system, comprising the steps of:
    receiving said first combinatorial index q according to the above; and
    decoding said first combinatorial index q so as to obtain the frequency positions of the K number of sets of physical resource units.

Preferred embodiments of the method in a network control node and in the mobile station are defined in the appended dependent claims. Any method according to the present invention can be executed in processing means.

The present invention also relates to a corresponding network control device and mobile station device.

The present invention provides a solution which results in low overhead signalling with maximum flexibility regarding resource allocation of system bandwidth.

Further applications and advantages of the invention will be apparent from the following detailed description.

BRIEF DESCRIPTION OF THE DRAWINGS

FIG. 2 shows signalling overhead reduction, compared to the full bitmap case, as a function of the number M of distinct PRB pairs allocated in up to K=2 EPDCCH sets and the downlink system bandwidth. The gray area refers to the cases where further overhead reduction cannot be achieved compared to the baseline scheme.

DETAILED DESCRIPTION OF THE INVENTION

Figure 1:
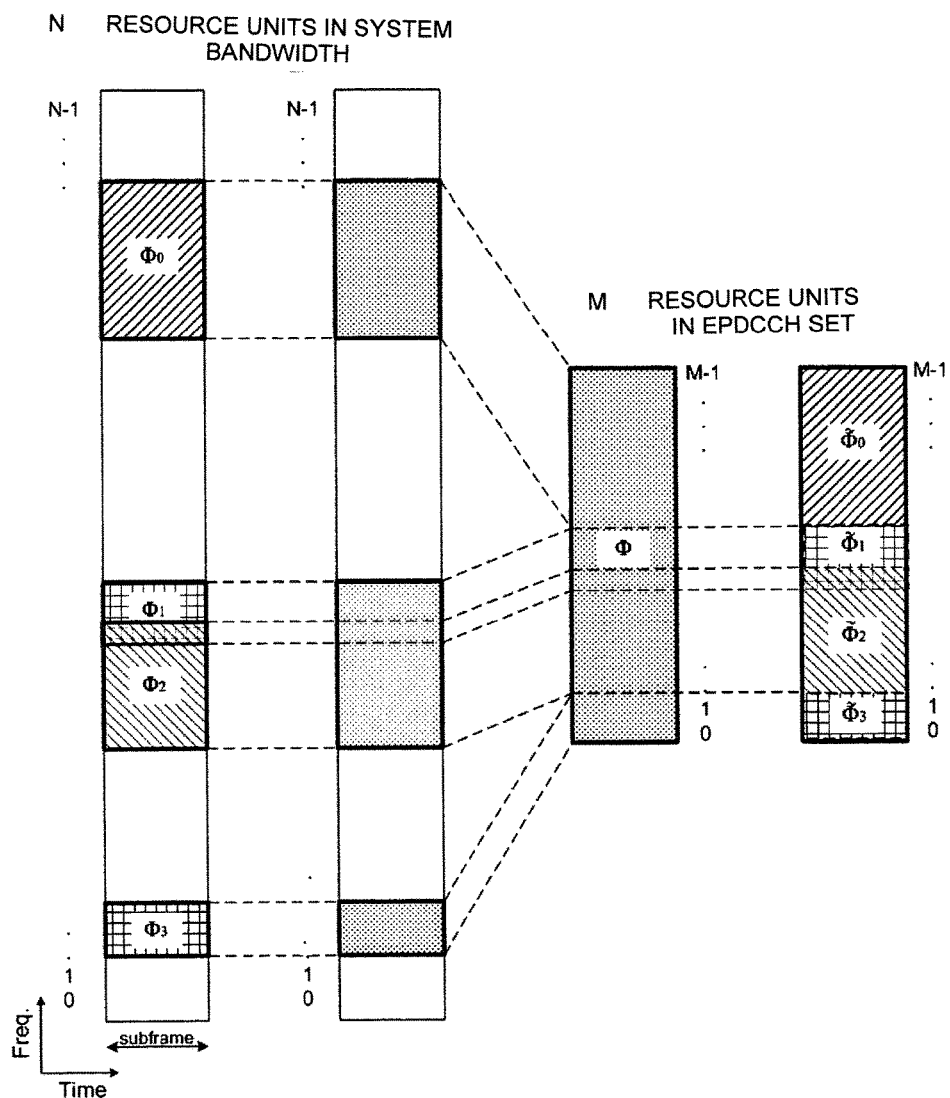
FIG. 1 illustrates an embodiment of the present invention.

To achieve the aforementioned and other objects, the present invention relates to a method in a network control node and to a corresponding method in a mobile station. The network control node and the mobile station are any suitable nodes arranged for communication in wireless communication systems, such as LTE and LTE Advanced 3GPP systems. For example, the network control node may be an eNodeB and the mobile stations UEs. The wireless communication system uses system frequency bandwidth for downlink transmissions from the network control node to mobile stations.

The present method in the network control node comprises the steps of: allocating K number of sets of physical resource units arbitrarily chosen within the system frequency bandwidth for downlink transmissions, wherein K is an integer equal to or larger than 1 and the number of physical resource units of each set is selected from a finite set of allowed values; jointly encoding the frequency positions of the K number of sets of physical resource units into a first unique combinatorial index q; and signalling the first combinatorial index q in the downlink.

The signalling can e.g. be performed in higher layer of the system such as in the Radio Resource Control (RRC) layer. Preferably, according to an embodiment of the invention the K number of sets of physical resource units are allocated for transmission of downlink control channels, such as EPDCCH in LTE Rel. 11 systems.

The corresponding method in a mobile station comprises the steps of: receiving the first combinatorial index q according to any embodiments of the present method in the network control node; and decoding the first combinatorial index q so as to obtain the frequency positions of the K number of sets of physical resource units. The method in the mobile station can be modified to correspond to the different embodiments of the method in the network control node.

In the following description of embodiments of the present invention, the terminology from the 3GPP LTE system (such as EPDCCH, EPDCCH set, PRB pair, subframe, etc.) is occasionally used, but the skilled reader may interchangeably consider more general notations of channels and signals with the same functionalities and properties.

The present invention discloses a method for allocating and signalling from a network control device to a mobile station with the minimum amount of information bits, the location within the system frequency bandwidth for downlink transmissions of a radio communication system of a plurality of K resource sets $\Phi_k = \{n_i\}_{i=0}^{M_k-1}$ with $k=0, \ldots, K-1$, each consisting of a number $M_k = |\Phi_k|$ of physical resource units labelled by an integer index $1 \leq n_i \leq N$. In the related art LTE system, the sets $\Phi_k$ could correspond to the sets of physical resource block (PRB) pairs configured for the transmission of enhanced downlink control channel (EPDCCH) signals, called EPDCCH sets in LTE terminology. The number of physical resource units $M_k$ in the resource set $\Phi_k$ is selected among a finite set $\Omega = \{M_1, M_2, \ldots, M_J\}$ of allowed values, where $1 \leq M_j \leq N$, $M_j < M_{j+1}$ for $j=1, \ldots, J$, is a non-negative integer number, and N denotes the maximum number of resource units in the system frequency bandwidth for downlink transmission. In the related art LTE system, N could represents the system bandwidth expressed, for instance, in number of physical resource block (PRB) (i.e. $N_{RB}^{DL}$ in the LTE terminology) or in terms of resource block groups (RBGs) (i.e. $N_{RBG}$ in the LTE terminology).

As mentioned above, it is an object of this invention to provide efficient signalling to minimize the amount of information bits required to signal the frequency location of a plurality of sets of physical resource units, with resource units arbitrarily chosen within the system frequency bandwidth for downlink transmission of a wireless communication system.

To enable such improved signalling method, the present invention discloses how the frequency location of K sets of physical resource units arbitrarily chosen in the downlink system frequency bandwidth, with K being an integer equal to or larger than 1, can be jointly encoded into a unique number, i.e. a combinatorial index that univocally identifies the location of the selected sets of physical resource units among all possible combination of resource sets, with the same characteristics, that can be allocated within the system frequency bandwidth for downlink transmissions.

Given the total number N of physical resource units in the system, and the permitted resource set size $M_j \in \Omega$, there are $$C = \sum_{M_j \in \Omega} \binom{N}{M_j}$$

possible sets of $M_j \in \Omega$ indices of physical resource units $\{n_i\}_{i=0}^{M_j-1}$ with $1 \leq n_i \leq N$ and $n_i \leq n_{i+1}$ configurable within the system frequency bandwidth for downlink transmissions. Each set $\{n_i\}_{i=0}^{M_j-1}$ of sorted resource indices can be labelled by a unique second combinatorial index c defined as $$c = \sum_{i=0}^{M_j-1} \binom{N-n_i}{M_j-i} + O_j, \quad (1)$$

$$\text{where } \binom{x}{y} = \begin{cases} \binom{x}{y} & \text{if } x \geq y \\ 0 & \text{if } x < y \end{cases}$$

is an extended binomial coefficient resulting into a unique combinatorial index $$c \in \left\{0, \ldots, \sum_{M_j \in \Omega} \binom{N}{M_j} - 1\right\}.$$

The range of c is divided into J intervals, and the offset $O_j$ for the $j^{th}$ interval ensures that the interval is large enough to contain all $$\binom{N}{M_j}$$

sets of $M_j$ PRB pairs. Therefore, $$O_j = \sum_{k=1}^{j-1} \binom{N}{M_k}, \quad j = 1, \ldots, J. \quad (2)$$

Assuming the smallest size $M_j \in \Omega$ of a set of resource units is zero, the combinatorial index c=0 is associated to an empty set of physical resource units.

If the number K of resource sets that shall be configured is known at the mobile station, then there are $$\binom{C}{K}$$

sets $\{c_k\}_{k=0}^{K-1}$, with $1 \leq c_k \leq C$ and $c_k \leq c_{k+1}$, each formed by K out of the C second combinatorial indices $C_k$ obtained from equation (1), each labelling a set $\{n_i\}_{i=0}^{M_j-1}$ of indices of physical resource units. Therefore, any configuration of K sets of physical resource units can be signalled with $$B_K = \left\lceil \log_2 \binom{C}{K} \right\rceil$$

bits as the binary representation of a first unique combinatorial index q associated to the set $\{c_k\}_{k=0}^{K-1}$ and defined similarly to Eq. (1) as $$q = \sum_{k=0}^{K-1} \binom{C-c_k}{K-k}. \quad (3)$$

The first combinatorial index q jointly encodes the location within the downlink system frequency bandwidth of the individual sets of physical resource units, where each set is univocally identified by the indices of the resources (e.g. PRB pairs) in the set.

It is clear to a skilled reader in the art that the first combinatorial index q can also be mapped on a word of symbols from another alphabet. It is also clear to the skilled reader that by enforcing a different sorting of indices in the sets $\{n_i\}_{i=0}^{M_j-1}$ (or $\{c_k\}_{k=0}^{K-1}$), such as $1 \le n_i \le N$ and $n_i \ge n_{i+1}$, equations (1) or (2) may be modified to yield another unique combinatorial index.

An advantage of the present method is that it achieves, with the minimum amount of bits, the same resource allocation flexibility that would be possible to obtain with a full system resource bitmap per each allocated set of physical resource units. Another advantage, compared to prior art, is that all sets of physical resource units are jointly encoded into a unique codeword, whose length $B_K$ is readily derived by the mobile station upon knowing the total number of system resources N and the set $\Omega = \{M_1, M_2, \ldots, M_J\}$ of allowed set dimensions, and the number K of allocated sets.

The signalling overhead of the present method depends on the system frequency bandwidth N for downlink transmissions and the admissible set sizes in $M_j \in \Omega$. Table 2 illustrates an example of signalling overhead reduction for the related art LTE system, with different bandwidth configurations N (expressed in number of PRB pairs), and up K=2 EPDCCH sets, with admissible set size chosen in $\Omega = \{0, 2, 4, 8\}$ PRB pairs, allocated for EPDCCH signal transmission.

TABLE 2

Signalling overhead compared to the full bitmap case.

| System bandwidth N (RB) | $\left\lceil \log_2 \binom{C}{K} \right\rceil$ (bits) | Full bitmap for two sets (bits) | Overhead reduction |
|---|---|---|---|
| 6 | 9 | 12 | 25% |
| 15 | 25 | 30 | 17% |
| 25 | 40 | 50 | 20% |
| 50 | 58 | 100 | 42% |
| 100 | 74 | 200 | 63% |

As for the decoding in the mobile station, the decoding can be performed by modifying the method in: Mattias Wennström & Oskar Mauritz, Method and system for subband indicator signalling", Procede et systeme de signalisation par indicateurs de sous-bande, Huawei Technologies HUAWEI TECHNOLOGIES Jul. 17, 2012: CA 2646693. The decoding method in the mobile station consists of two steps:

Step 1: Apply the decoding method from the cited prior art above to the first combinatorial index q to get a set of second combinatorial indices $\{c_k\}_{k=0}^{K-1}$;

Step 2: Apply iteratively the decoding method from the cited prior art to each individual second combinatorial index $C_k$ obtained at step 1 to obtain the associated set $\{n_i\}_{i=0}^{M_j-1}$ of indices of physical resource units.

The difference from prior art is the double encoding/decoding, where the decoding is performed by iteratively applying the method in the cited prior art to each combinatorial index.

According to an embodiment of the present method, only the maximum number $K_{max}$ of configurable sets of physical resource unit is available at the mobile station. When the exact number K of allocated sets of physical resource units is not known a priori by the mobile station, but only the maximum number $K_{max}$ of configurable sets is known, all possible sets of indices $\{c_k\}_{k=0}^{K-1}$ with K=1, ..., $K_{max}$ should be considered. In this case, there are $$\sum_{K=1}^{K_{max}} \binom{C}{K}$$

sets $\{c_k\}_{k=0}^{K-1}$, with $1 \le c_k \le C$ and $c_k \le c_{k+1}$, each formed by K out of the C second combinatorial indices $C_k$ obtained from equation (1), each labelling a set $\{n_i\}_{i=0}^{M_j-1}$ of indices of physical resource units.

Therefore, any configuration of K sets of physical resource units, with K=1, ..., $K_{max}$, can be signalled with $$B_K = \left\lceil \log_2 \left( \sum_{K=1}^{K_{max}} \binom{C}{K} \right) \right\rceil$$

bits as the binary representation of a first unique combinatorial index $$q \in \left\{ 0, \ldots, \sum_{K=1}^{K_{max}} \binom{C}{K} - 1 \right\}$$

associated to the set $\{c_k\}_{k=0}^{K-1}$ and defined as $$q = \sum_{k=0}^{K-1} \binom{C-c_k}{K-k} + O_K \quad K = 1, \ldots, K_{max}. \quad (4)$$

Similarly to Eq. (1), the range of q is divided into $K_{max}$ intervals, and the offset $O_K$ for the $j^{th}$ interval ensures that the interval is large enough to contain all $$\binom{C}{K}$$

sets of K indices $\{c_k\}_{k=0}^{K-1}$.

According to another embodiment of the invention, the position within the downlink system frequency bandwidth of all distinct resources in the union of all resource sets is jointly encoded into a third unique combinatorial index. According to the general method of the invention, the number of bits required to signal the allocated resource sets of physical resource units is a function of the number of resources available in the system, the allowed resource sizes $M_j \epsilon \Omega$, and the number of allocated sets K. However, in some cases it is possible to utilize fewer information bits to signal a specific configuration of K sets of physical resource units by exploiting the fact that the network control node has the knowledge of which (distinct) physical resource units that are allocated among all the K sets, and exploiting this information to reduce the number C of all possible combination of sets of physical resource units to be considered within the downlink system bandwidth.

One method to achieve this objective is to introduce a preliminary mapping of all distinct physical resources units that shall be allocated to a mobile station, i.e. without distinguishing to which set of physical resource units they belong to, and then apply the general method to this reduced set of resource units. In this first step, the superset of resource units $$\Phi = \bigcup_{k=0}^{K-1} \Phi_k$$

consisting of the indices of the distinct resource units, i.e. without repetitions, in the union of all the sets of physical resource units $\Phi_k$ allocated to a given mobile station is univocally encoded into a unique third combinatorial index. Given the size $M=|\Phi|$ of the set d, there are $$\binom{N}{M}$$

possible combination of sets $\{n_m\}_{m=0}^{M-1}$, with $0 \leq n_m \leq N-1$ and $n_m < n_{m+1}$, each consisting of M indices of resource units out the N resources available in the system frequency bandwidth fro downlink transmissions. Each set $\{n_m\}_{m=0}^{M-1}$ of sorted indices of physical resource units can univocally be encoded into a third unique combinatorial index $$r \in \left\{0, \ldots, \binom{N}{M} - 1\right\}$$

defined as $$r = \sum_{m=0}^{M-1} \binom{N - n_n}{M - m}, \quad (5)$$

which can be signalled to the mobile station with a word of $$B_M = \left\lceil \log_2 \binom{N}{M} \right\rceil$$

bits as the binary representation of r. In other words, the unique third combinatorial index r univocally defines a mapping between the physical resource units indexing $n=0, \ldots, N-1$ within the downlink system frequency bandwidth, and the indexing $m=0, \ldots, M-1$ of resource units in the superset $\Phi$, i.e. a unique n-to-m mapping. FIG. 1 shows an example of how the distinct resource units belonging to four resource sets $\Phi_k$ $k=0, \ldots, 3$ are grouped, without repetitions, into a superset $\Phi$, which is then encoded into the third combinatorial index r.

The indices of the resource units within each set $\Phi_k$ are mapped into the logical indices $m=0, \ldots, M-1$ enumerating the resource units of the superset $\Phi$. In other words, each set $\Phi_k$ of physical resource units within the system bandwidth is univocally associated with a logical set $\tilde{\Phi}_k$ of physical resource units within the set $\Phi$ as in FIG. 1. The general method described in Eq. (1)-(3) can now be applied to the logical sets $\tilde{\Phi}_k$ within the superset $\Phi$ by replacing N with M in all equations. Specifically, given the allowed set sizes $\Omega = \{M_1, M_2, \ldots, M_J\}$ there are $$C = \sum_{\substack{M_j \in \Omega \\ M_j \leq M}} \binom{M}{M_j}, \quad (5)$$

possible sets $\{m_i\}_{i=0}^{M_j-1}$ of $M_j \epsilon \Omega$ indices of resource units, with $1 \leq m_i \leq M$ and $m_i \leq m_{i+1}$ configurable within the set $\Phi$, where the constraint $M_j \leq M$ $\forall j$ ensures that only sets of feasible size are considered.

The decoding method in the mobile station in this case comprises the steps of:
Step 0: Decode M;
Step 1: decode the first combinatorial index q to get the set $\{c_k\}_{k=0}^{K-1}$ of the second combinatorial indices;
Step 2: decode each second combinatorial index $C_k$ to obtain the associated set of indices of (logical) resource units $\{m_i\}_{i=0}^{M_j-1}$, where the indexing $0 \leq m_i \leq M-1$ refers to the resource units indexing in the union set;
Step 3: decode the third combinatorial index r and obtain the associated set $\{n_m\}_{m=0}^{M-1}$ consisting of the indices of physical resource units in the system frequency bandwidth used in the union of all sets with $0 \leq n_m \leq N-1$ and $n_m < n_{m+1}$. As each index $n_m$ of resource units is univocally mapped into an index $0 \leq m \leq M-1$, the indices of logical resource units $\{m_i\}_{i=0}^{M_j-1}$ can be mapped back into their original indexing $\{n_i\}_{i=0}^{M_j-1}$ with respect to the downlink system bandwidth.

The signalling requirements for this method consists of the total number of distinct resources M allocated for the mobile station, and the two combinatorial indices r and q. In some cases, this approach allows to further reduce, compared to the general method described in Eq. (1)-(3), the number of information bits required to signal a given allocation of K sets of physical resource units to a mobile station. In particular, the signalling overhead will depend also on the number M of distinct resource units allocated for the EPDCCH sets as shown in the Table in FIG. 2, where the overhead reduction is computed versus the full bitmap case. The Table in FIG. 2 addresses only the cases where this embodiment results in further signalling overhead reduction compared to the general method of the present invention.

In yet another embodiment of the invention, the basic physical resource unit to be allocated is any of: a physical resource block (PRB); a physical resource block (PRB) pair;

a resource block group (RBG) consisting of an arbitrary number of adjacent PRB pairs; a resource block group (RBG) consisting of a number of adjacent PRB pairs that depends on the systems bandwidth; a resource block group (RBG) consisting of an arbitrary number of nonadjacent PRB pairs; a resource block group (RBG) consisting of a number of nonadjacent PRB pairs that depends on the systems bandwidth. An advantage with this embodiment is that it applies to any resource granularity defined in the system.

As the granularity of the system resource unit is not a limiting constraint of the present method, the method applies to a variety of cases depending on the basic resource unit defined for the downlink system bandwidth. In the related art LTE systems, for instance, the smallest physical resource unit that can be allocated for communication is a physical resource block (PRB) which occupies a half of a subframe, called "slot", consisting of six or seven consecutive OFDM symbol intervals in time domain (0.5 millisecond in total), and twelve consecutive sub-carrier frequencies in frequency domain (180 kHz in total). However, the smallest schedulable resource unit is a physical resource blocks (PRB) pair, that is a pair of consecutive resource block in the time domain within a subframe (i.e. 1 millisecond in total).

To reduce signalling overhead, the related art LTE system also exploits resource allocation methods where the smallest unit of resource allocated consists of a group of consecutive PRBs in the frequency domain, so called resource block groups (RBGs), where the number of consecutive PRBs forming an RBG can vary with the size of the downlink system bandwidth. The signalling method disclosed in this invention applies to, but is not limited by, all the above cases independently of the granularity of the resource unit.

Furthermore, as understood by the person skilled in the art, any method according to the present invention may also be implemented in a computer program, having code means, which when run by processing means causes the processing means to execute the steps of the method. The computer program is included in a computer readable medium of a computer program product. The computer readable medium may comprises of essentially any memory, such as a ROM (Read-Only Memory), a PROM (Programmable Read-Only Memory), an EPROM (Erasable PROM), a Flash memory, an EEPROM (Electrically Erasable PROM), or a hard disk drive.

Moreover, the present invention further relates to a network control device and a mobile station device corresponding to the present methods in the network node and mobile station. Mentioned devices comprise the suitable means (such as input and output means, memory means, signal processing means, communication means, antenna means, etc.) for downlink communication between the devices. The network control node is arranged control one or more mobile station devices and further being arranged for downlink transmissions; and the mobile station is arranged to receive the downlink transmissions from the network control node. It is also realised that the network control device and a mobile station device can be modified, mutatis mutandis, to the different embodiments of the methods in the network node and mobile station.

Finally, it should be understood that the present invention is not limited to the embodiments described above, but also relates to and incorporates all embodiments within the scope of the appended independent claims.

The invention claimed is:

1. A method in a network control node of a wireless communication system, the wireless communication system using a system frequency bandwidth for downlink transmissions of enhanced physical downlink control channel (EPDCCH) from the network control node to one or more mobile stations of the wireless communication system, the method comprising:

allocating K number of sets of physical resource units arbitrarily chosen within the system frequency bandwidth for the downlink transmissions of the EPDCCH, wherein K is an integer larger than 1 and a number of physical resource units of each set is selected from a finite set of allowed values;

jointly encoding the frequency positions of the K number of sets of physical resource units into a first unique combinatorial index q for all of the K number of sets of physical resource units, wherein the jointly encoding includes labelling each of the K number of sets of physical resource units by using a second unique combinatorial index c and jointly encoding the labelled K number of sets of physical resource units using the first unique combinatorial index q for all of the K number of sets of physical resource units; and signaling the first unique combinatorial index q in a downlink, wherein the signaling the first unique combinatorial index q in the downlink reduces a number of overhead bits for mapping EPDCCH to the physical resource units.

2. The method according to claim 1, wherein the second unique combinatorial index c is defined as:

$$c = \sum_{i=0}^{M_j-1} \left\langle \begin{matrix} N - n_i \\ M_j - i \end{matrix} \right\rangle + O_j,$$

where N denotes the downlink system bandwidth expressed in number of physical resource units, $M_j$ denotes the number of physical resource units in the allocated set of physical resource units indices $\{n_i\}_{i=0}^{M_j-1}$ associated with the second unique combinatorial index c with size $M_j$ chosen from a finite set of allowed values $\Omega = \{M_1, M_2, \ldots, M_j\}$, and where $$\left\langle \begin{matrix} x \\ y \end{matrix} \right\rangle = \begin{cases} \binom{x}{y} & \text{if } x \geq y \\ 0 & \text{if } x < y \end{cases}$$

is an extended binomial coefficient resulting in a unique combinatorial index $$c \in \left\{ 0, \ldots, \sum_{M_j \in \Omega} \binom{N}{M_j} - 1 \right\},$$

where the range of c is divided into j intervals, and the offset $$O_j = \sum_{k=1}^{j-1} \binom{N}{M_k}$$

ensures that the $j^{th}$ interval is configured to contain all possible combinations of $$\binom{N}{M_j}$$

sets of $M_j$ physical resource units.

3. The method according to claim 1, wherein the first unique combinatorial index q is defined as:

$$q = \sum_{k=0}^{K-1} \binom{C - c_k}{K - k}, \text{ where } C = \sum_{M_j \in \Omega} \binom{N}{M_j}$$

denotes the number of all possible combinations of sets of size $M_j$ out of N physical resource units with size $M_j$ chosen from a finite set of allowed values $\Omega = \{M_1, M_2, \ldots, M_j\}$, and $\{ck\}_{k=0}^{K-1}$ denotes the set of K number of second unique combinatorial indices $c_k$ associated with each of the K allocated sets of physical resource units.

4. The method according to claim 1, wherein the K number of sets of physical resource units are allocated for transmission of downlink control channels, such as EPDCCH.

5. The method according to claim 1, wherein the physical resource units are any in the group comprising: physical resource blocks (PRBs), physical resource block (PRB) pairs, resource block group comprising of a number of adjacent physical resource block (PRB) pairs depending on the system frequency bandwidth, and resource block groups comprising of a number of non-adjacent physical resource block (PRB) pairs depending on the system frequency bandwidth.

6. The method according to claim 1, wherein the first unique combinatorial index q is signal in the radio resource control (RRC) layer of the wireless communication system.

7. The method according to claim 1, wherein the method further comprises:
jointly encoding the union of all the K number of sets of physical resource units which are distinct to each other into a unique combinatorial index r; and
signaling the combinatorial index r and the number of distinct physical resource units in the downlink.

8. A method in a mobile station of a wireless communication system, comprising:
receiving a first combinatorial index q in a downlink from a network control node of the wireless communication system;
receiving a combinatorial index r, and
decoding the first combinatorial index q by using the combinatorial index r, so as to obtain the frequency positions of the K number of sets of physical resource units,
wherein the wireless communication system uses a system frequency bandwidth for downlink transmissions of enhanced physical downlink control channel (EPDCCH) from the network control node to the mobile station of the wireless communication system, and
wherein a method in the network control node of the wireless communication system comprises:
allocating K number of sets of physical resource units arbitrarily chosen within the system frequency bandwidth for the downlink transmissions of the EPDCCH,
wherein K is an integer larger than 1 and a number of physical resource units of each set is selected from a finite set of allowed values;
jointly encoding the frequency positions of the K number of sets of physical resource units into a first combinatorial index q for all of the K number of sets of physical resource units; and
signalling the first combinatorial index q in a downlink,
wherein the signalling the first combinatorial index q in the downlink reduces a number of overhead bits for mapping EPDCCH to the physical resource units.

9. The method according to claim 8, wherein the mobile station comprises a memory storing a maximum number of allocated sets of physical resource units $K_{max}$, where K is less than or equal to $K_{max}$.

10. The method according to claim 1, wherein:
the wireless communication system is a third generation partnership project (3GPP) communication system including one or any combination of Long Term Evolution (LTE) or LTE Advanced;
the network control node is an eNodeB, and the one or more mobile stations are user equipments (UEs).

11. At least one non-transitory computer readable storage medium storing computer readable instructions which when executed control at least one hardware processor to implement a method in a network control node of a wireless communication system, the wireless communication system using a system frequency bandwidth for downlink transmissions of enhanced physical downlink control channel (EPDCCH) from the network control node to one or more mobile stations of the wireless communication system, the method comprising:
allocating K number of sets of physical resource units arbitrarily chosen within the system frequency bandwidth for the downlink transmissions of the EPDCCH, wherein K is an integer larger than 1 and a number of physical resource units of each set is selected from a finite set of allowed values;
jointly encoding the frequency positions of the K number of sets of physical resource units into a first unique combinatorial index q for all of the K number of sets of physical resource units, wherein the jointly encoding includes labelling each of the K number of sets of physical resource units by using a second unique combinatorial index c and jointly encoding the labelled K number of sets of physical resource units using the first unique combinatorial index q for all of the K number of sets of physical resource units; and
signalling the first unique combinatorial index q in a downlink,
wherein the signalling the first unique combinatorial index q in the downlink reduces a number of overhead bits for mapping EPDCCH to the physical resource units.

12. The at least one non-transitory computer readable storage medium of claim 11 comprises of one or more from the group consisting of: ROM (Read-Only Memory), PROM (Programmable ROM), EPROM (Erasable PROM), Flash memory, EEPROM (Electrically EPROM) and hard disk drive.

13. A network control device of a wireless communication system including one or more mobile station devices, the network control device comprising:
the network control device being configured to control the one or more mobile station devices and further being configured for downlink transmissions of enhanced physical downlink control channel (EPDCCH) to the one or more mobile station devices, wherein a system frequency bandwidth is used for the downlink transmissions of the EPDCCH from the network control device to the one or more mobile station devices; and the network control device further being configured to:
allocate K number of sets of physical resource units arbitrarily chosen within the system frequency bandwidth for downlink transmissions, wherein K is an integer larger than 1 and a number of physical resource units of each set is selected from a finite set of allowed values;

jointly encode the frequency positions of the K number of sets of physical resource units into a first unique combinatorial index q for all of the K number of sets of physical resource units, wherein the jointly encoding includes labelling each of the K number of sets of physical resource units by using a second unique combinatorial index c and jointly encoding the labelled K number of sets of physical resource units using the first unique combinatorial index q for all of the K number of sets of physical resource units; and signal the first combinatorial index q in a downlink, wherein the network control device reduces a number of overhead bits for mapping EPDCCH to the physical resource units by the signaling the first combinatorial index q in the downlink.

14. A wireless communication system including one or more mobile station devices and a network control device, wherein the mobile station device is configured to:

receive downlink transmissions of enhanced physical downlink control channel (EPDCCH), receive the first combinatorial index q in the downlink transmissions from the network control device, and decode the first combinatorial index q so as to obtain the frequency positions of the K number of sets of physical resource units;

wherein the network control device of a wireless communication system comprises:

the network control device being configured to control the mobile station device and further being configured for downlink transmissions of EPDCCH to the mobile station device, wherein a system frequency bandwidth is used for the downlink transmissions of the EPDCCH from the network control device to the one or more mobile station devices of the wireless communication system;

wherein the network control device is further configured to:

allocate K number of sets of physical resource units arbitrarily chosen within the system frequency bandwidth for downlink transmissions, wherein K is an integer larger than 1 and a number of physical resource units of each set is selected from a finite set of allowed values, jointly encode the frequency positions of the K number of sets of physical resource units into a first unique combinatorial index q for all of the K number of sets of physical resource units, wherein the jointly encoding includes labelling each of the K number of sets of physical resource units by using a second unique combinatorial index c and jointly encoding the labelled K number of sets of physical resource units using the first unique combinatorial index q for all of the K number of sets of physical resource units, and signal the first combinatorial index q in a downlink; and wherein the network control device reduces a number of overhead bits for mapping EPDCCH to the physical resource units by the signaling the first combinatorial index q in the downlink.

* * * * *